(12) United States Patent
Kim et al.

(10) Patent No.: US 11,577,506 B2
(45) Date of Patent: Feb. 14, 2023

(54) APPARATUS AND METHOD FOR INSPECTING DROPLET

(71) Applicant: SEMES CO., LTD., Cheonan-si (KR)

(72) Inventors: Kwang Sup Kim, Asan-si (KR); Dong Ok Ahn, Anyang-si (KR); Jong Min Lee, Yongin-si (KR); Jun Ho Oh, Hwaseong-si (KR); Ji Hoon Yoo, Hwaseong-si (KR); Young Ho Park, Incheon (KR)

(73) Assignee: SEMES CO., LTD., Cheonan-si (KR)

( * ) Notice: Subject to any disclaimer, the term of this patent is extended or adjusted under 35 U.S.C. 154(b) by 38 days.

(21) Appl. No.: 17/467,266

(22) Filed: Sep. 5, 2021

(65) Prior Publication Data
US 2022/0072848 A1    Mar. 10, 2022

(30) Foreign Application Priority Data
Sep. 8, 2020    (KR) ........................ 10-2020-0114835

(51) Int. Cl.
*B41J 2/045*    (2006.01)
*B41J 2/175*    (2006.01)

(52) U.S. Cl.
CPC ......... *B41J 2/0456* (2013.01); *B41J 2/04505* (2013.01); *B41J 2/1752* (2013.01); *B41J 2/17566* (2013.01); *B41J 2002/17583* (2013.01)

(58) Field of Classification Search
CPC .... B41J 2/04505; B41J 2/0456; B41J 2/1752; B41J 2/17566; B41J 2002/17583
See application file for complete search history.

(56) References Cited

FOREIGN PATENT DOCUMENTS

| JP | H10267737 | * | 10/1998 | .............. B41J 2/175 |
|----|-----------|---|---------|----------|
| JP | 2012166411 | * | 9/2012 | .............. B41J 2/175 |

* cited by examiner

*Primary Examiner* — Anh T Vo

(57) ABSTRACT

Disclosed are an apparatus and a method for quickly and accurately inspecting a droplet on a substrate. An apparatus for inspecting a droplet on a substrate according to an exemplary embodiment of the present disclosure includes: an ultrasonic sensor configured to apply an ultrasonic wave to a droplet on the substrate and detect an ultrasonic wave reflected from the substrate; and a processor configured to acquire a height of the droplet at each position on the substrate on the basis of a signal of the ultrasonic wave reflected from the droplet on the substrate, calculate a volume of the droplet on the basis of the heights of the droplet at the positions, and store or output data in relation to the volume of the droplet. The embodiment of the present disclosure may calculate the volume of the droplet using the ultrasonic wave, thereby quickly and accurately inspecting the droplet on the substrate.

20 Claims, 22 Drawing Sheets

APPARATUS AND METHOD FOR INSPECTING DROPLET

CROSS-REFERENCE TO RELATED APPLICATIONS

This application claims the priority of Korean Patent Application No. 10-2020-0114835 filed on Sep. 8, 2020, in the Korean Intellectual Property Office, the disclosure of which is incorporated herein by reference.

BACKGROUND

Field

The present disclosure relates to an apparatus and a method for inspecting a droplet on a substrate, and more particularly, to an apparatus and a method for inspecting a volume of a droplet in an inkjet printing facility.

Description of the Related Art

As a display panel for transmitting visual information to a user, there is used a display panel such as a liquid crystal display (LCD) panel, a plasma display panel (PDP), and an organic light emitting display (OLED) panel.

In order to manufacture the display panel, an inkjet printing technique has been introduced as a technique for forming a specific pattern (e.g., a color filter) on a substrate (e.g., a glass sheet). The inkjet printing refers to a method that discharges a liquid along a pattern to be formed on the substrate and then cures the liquid by means of a heat treatment. The advantage of the inkjet printing is that the inkjet printing may quickly and simply form a desired pattern.

Meanwhile, in order to cope with an increase in size of the substrate and to form a fine pattern, there is a need for a technology for accurately discharging a desired quantity of droplets at a desired position during an inkjet printing process, and there is a need for a technology for accurately checking whether a droplet is accurately discharged onto the substrate.

SUMMARY

The present disclosure has been made in an effort to provide an apparatus and a method for quickly and accurately inspecting a droplet on a substrate.

The object of the present disclosure is not limited to the above-mentioned object, and other objects, which are not mentioned above, may be clearly understood by those skilled in the art from the following descriptions.

In one aspect, the present disclosure provides an apparatus for inspecting a droplet on a substrate, the apparatus including: an ultrasonic transmitter configured to apply an ultrasonic wave to a droplet on the substrate; an ultrasonic receiver configured to detect an ultrasonic wave reflected from the substrate; and a processor configured to acquire a height of the droplet at each position on the substrate on the basis of a signal of the ultrasonic wave reflected from the droplet on the substrate, calculate a volume of the droplet on the basis of the heights of the droplet at the positions, and store or output data in relation to the volume of the droplet.

In the embodiment, the processor may create a three-dimensional graphic image corresponding to a shape of the droplet on the basis of values of the heights of the droplet at the two-dimensional positions on the substrate, calculate a volume of the three-dimensional graphic image corresponding to the shape of the droplet, and control the amount of liquid to be discharged by comparing the volume with a reference volume.

In the embodiment, the processor may create a three-dimensional graph representing the values of the heights of the droplet at the two-dimensional positions on the substrate, and model the three-dimensional graphic image corresponding to the shape of the droplet by applying interpolation to the adjacent values of the heights in the three-dimensional graph.

In the embodiment, the processor may determine whether the shape of the droplet is within a reference shape range on the basis of the three-dimensional graphic image.

In the embodiment, the ultrasonic transmitter and the ultrasonic receiver may be positioned below the substrate.

In the embodiment, the ultrasonic transmitter and the ultrasonic receiver may be installed in a support unit configured to support the substrate.

In the embodiment, the apparatus may further include an inspection operating part configured to position the ultrasonic transmitter and the ultrasonic receiver below the substrate onto which the droplet is discharged.

In the embodiment, the inspection operating part may include: a horizontal drive part configured to convey the substrate to an inspection zone in which the droplet is inspected; and a vertical drive part configured to move upward the ultrasonic transmitter and the ultrasonic receiver positioned below the substrate positioned in the inspection zone to bring the ultrasonic transmitter and the ultrasonic receiver into contact with a lower portion of the substrate.

In the embodiment, the ultrasonic transmitter and the ultrasonic receiver may be positioned above the substrate.

In the embodiment, the ultrasonic transmitter and the ultrasonic receiver may be installed on a head unit configured to discharge the droplet or installed on a structure positioned above the substrate.

In another aspect, the present disclosure provides a method of inspecting a droplet on a substrate, the method including: applying an ultrasonic wave to a droplet on the substrate; detecting an ultrasonic wave reflected from the droplet on the substrate; acquiring a height of the droplet at each position on the substrate on the basis of a signal of the reflected ultrasonic wave; calculating a volume of the droplet on the basis of the heights of the droplet at the positions; and storing or outputting data in relation to the volume of the droplet.

In the embodiment, the calculating of the volume of the droplet may include: creating a three-dimensional graphic image corresponding to a shape of the droplet on the basis of values of the heights of the droplet at the two-dimensional positions on the substrate; calculating a volume of the three-dimensional graphic image corresponding to the shape of the droplet; and controlling the amount of liquid to be discharged by comparing the volume with a reference volume.

In the embodiment, the creating of the three-dimensional graphic image corresponding to the shape of the droplet may include: creating a three-dimensional graph representing the values of the heights of the droplet at the two-dimensional positions on the substrate; and modeling the three-dimensional graphic image corresponding to the shape of the droplet by applying interpolation to the adjacent values of the heights in the three-dimensional graph.

In the embodiment, the method may further include determining whether the shape of the droplet is within a reference shape range on the basis of the three-dimensional graphic image.

In the embodiment, the applying of the ultrasonic wave to the droplet on the substrate may include: positioning an ultrasonic transmitter and an ultrasonic receiver below the substrate onto which the droplet is discharged; and applying the ultrasonic wave to the droplet from the ultrasonic transmitter and the ultrasonic receiver.

In the embodiment, the positioning of the ultrasonic transmitter and the ultrasonic receiver below the substrate may include: conveying the substrate to an inspection zone in which the droplet is inspected; and moving upward the ultrasonic transmitter and the ultrasonic receiver positioned below the substrate positioned in the inspection zone to bring the ultrasonic transmitter and the ultrasonic receiver into contact with a lower portion of the substrate.

In still another aspect, the present disclosure provides an apparatus for inspecting a droplet on a substrate, the apparatus including: a support unit on which the substrate is seated; a head unit configured to discharge a droplet onto the substrate; an ultrasonic sensor installed on the support unit, configured to apply an ultrasonic wave to the droplet from below the substrate, and detect an ultrasonic wave reflected from the substrate; and a processor configured to acquire a height of the droplet at each position on the substrate on the basis of the ultrasonic wave reflected from the droplet on the substrate, calculate a volume of the droplet on the basis of the heights of the droplet at the positions, and output or store data in relation to the volume of the droplet.

The embodiment of the present disclosure may calculate a volume of a droplet using ultrasonic waves, thereby quickly and accurately inspecting the droplet on the substrate.

The effect of the present disclosure is not limited to the above-mentioned effect, and other effects, which are not mentioned above, may be clearly understood by those skilled in the art from the following descriptions.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
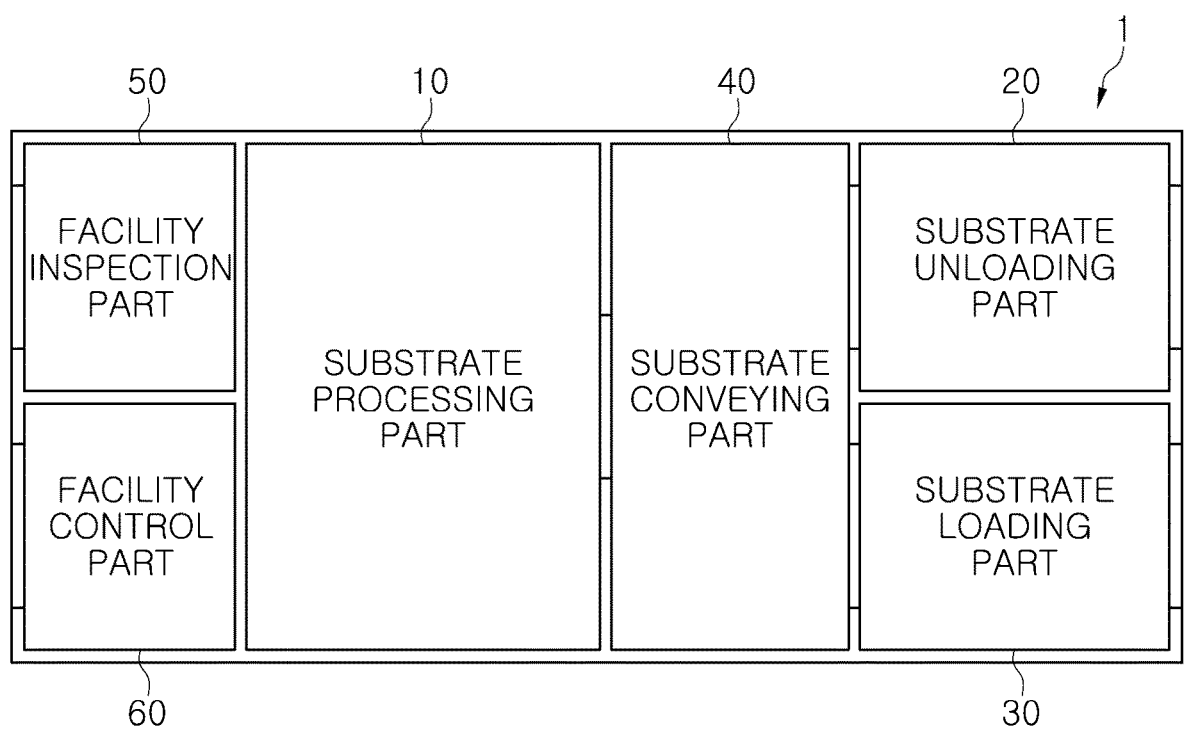
FIG. 1 is a view illustrating an example of an inkjet printing facility.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways and is not limited to the embodiments described herein.

A part irrelevant to the description will be omitted to clearly describe the present disclosure, and the same or similar constituent elements will be designated by the same reference numerals throughout the specification.

In addition, the constituent elements having the same configurations in the several embodiments will be assigned with the same reference numerals and described only in the representative embodiment, and only the constituent elements, which are different from the constituent elements according to the representative embodiment, will be described in other embodiments.

Throughout the specification, when one constituent element is referred to as being "connected to (or coupled to)" another constituent element, one constituent element can be "directly connected to (coupled to)" the other constituent element, and one constituent element can also be "indirectly connected to (coupled to)" the other element with other elements interposed therebetween. In addition, unless explicitly described to the contrary, the word "comprise/include" and variations such as "comprises/includes" or "comprising/including" will be understood to imply the inclusion of stated elements, not the exclusion of any other elements.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present application.

FIG. 1 illustrates an example of an inkjet printing facility 1. Referring to FIG. 1, the inkjet printing facility 1 includes a substrate processing part 10, a substrate loading part 30, a substrate conveying part 40, a substrate unloading part 20, a facility inspection part 50, and a facility control part 60.

The substrate processing part 10 may supply a liquid for forming a pattern on a substrate S. A specific function and a structure of the substrate processing part 10 for discharging the liquid onto the substrate S will be described below with reference to FIG. 2.

An operation of the inkjet printing facility 1 will be described. The substrate S onto which a processing liquid is to be applied is loaded into the substrate loading part 30. The substrate conveying part 40 conveys the substrate, which has been loaded into the substrate loading part 30, to the substrate processing part 10. The substrate processing part 10 is supplied with the processing liquid from a processing liquid supply device and discharges the processing liquid onto the substrate in an inkjet manner. When the process of discharging the processing liquid is completed, the substrate conveying part 40 conveys the substrate from the substrate processing part 10 to the substrate unloading part 20. The substrate onto which the processing liquid has been applied is unloaded through the substrate unloading part 20. The facility control part 60 controls overall operations of the substrate processing part 10, the substrate conveying part 40, the substrate loading part 30, the substrate unloading part 20, and the facility inspection part 50. The facility inspection part 50 may inspect respective modules of the substrate processing part 10. For example, the facility inspection part 50 may inspect a head unit 400 of the substrate processing part 10, and the head unit 400 will be described below. According to the embodiment of the present disclosure, the facility inspection part 50 may include an apparatus for inspecting a volume and/or a shape of a droplet D positioned on the substrate S.

Figure 2:
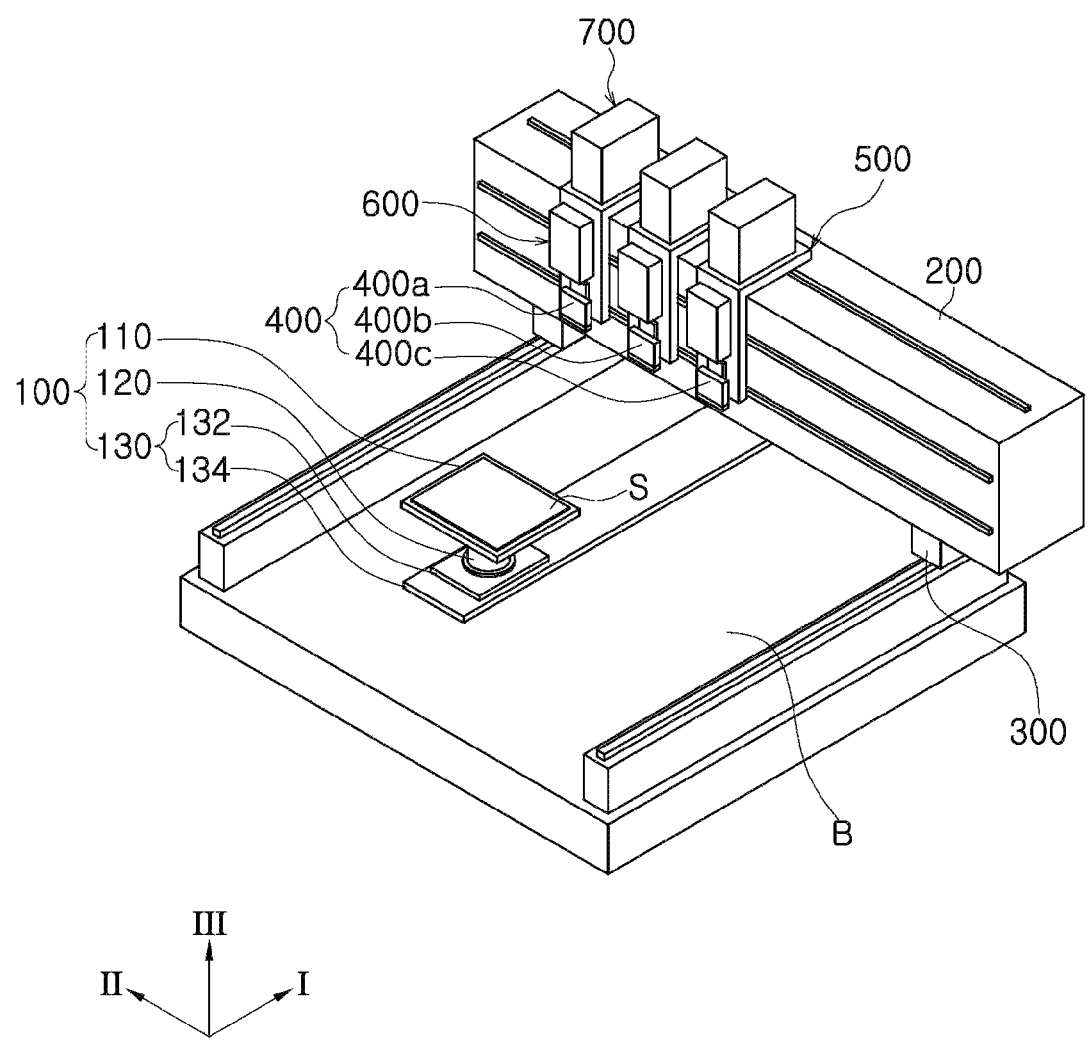
FIG. 2 is a view illustrating an example of a substrate processing part in the inkjet printing facility.

FIG. 2 illustrates an example of the substrate processing part 10 of the inkjet printing facility 1. FIG. 2 illustrates a schematic structure of an apparatus for discharging the processing liquid onto the substrate S in the inkjet printing facility 1 illustrated in FIG. 1.

Referring to FIG. 2, the substrate processing part 10 may include a base B, a support unit 110, a gantry 200, a gantry moving unit 300, head units 400, head moving units 500, processing liquid supply units 600, and control units 700.

The support unit 110 is disposed on an upper surface of the base B. For example, the base B may have, but not limited to, a rectangular parallelepiped shape having a predetermined thickness. The substrate S is seated on the support unit 110. A rotational driving member 120 is connected to a lower surface of the support unit 110. The rotational driving member 120 may be, but not limited to, a rotary motor. The rotational driving member 120 rotates the support unit 110 about a rotation center axis.

When the support unit 110 is rotated by the rotational driving member 120, the substrate S may be rotated by the rotation of the support unit 110. In a case in which a long side of a cell formed on the substrate S onto which the processing liquid is to be applied is disposed in a second direction II, the rotational driving member 120 may rotate the substrate so that the long side of the cell is disposed in a first direction I.

The support unit 110 and the rotational driving member 120 may be rectilinearly moved in the first direction I by the rectilinear driving member 130. For example, the rectilinear driving member 130 includes a slider 132 and a guide member 134. The rotational driving member 120 is installed on an upper surface of the slider 132. The guide member 134 is disposed on a central portion of the upper surface of the base B and elongated in the first direction I. A linear motor (not illustrated) may be embedded in the slider 132, and the slider 132 may be rectilinearly moved in the first direction I along the guide member 134 by the linear motor (not illustrated).

The gantry 200 is provided above the route along which the support unit 110 moves. The gantry 200 is disposed to be spaced apart upward from the upper surface of the base B. The gantry 200 is disposed in such a way that a longitudinal direction thereof is parallel to the second direction II. The head unit 400 may be coupled to the gantry 200 by the head moving unit 500. The head unit 400 may be rectilinearly moved in the longitudinal direction of the gantry, that is, in the second direction II by the head moving unit 500 and may also be rectilinearly moved in a third direction III by the head moving unit 500.

In this case, the third direction III is a direction different from the first direction I and the second direction II. For example, the third direction III may be a direction perpendicular to the first direction I and the second direction II.

The gantry moving unit 300 may move the gantry 200 rectilinearly in the first direction I or rotate the gantry 200 so that the longitudinal direction of the gantry 200 is parallel to a direction inclined with respect to the first direction I. The head unit 400 may be aligned in the direction inclined with respect to the first direction I as the gantry 200 rotates.

The head unit 400 discharges the processing liquid, which is supplied from the processing liquid supply unit 600, onto the substrate S, and the processing liquid is discharged in the form of a droplet. The head unit 400 may be provided in plural. FIG. 2 exemplarily illustrates three head units 400a, 400b, and 400c, but the present disclosure is not limited thereto. The head units 400 may be arranged side by side in a row in the second direction II and coupled to the gantry 200.

A plurality of discharge portions for discharging the droplets of the processing liquid is formed in a bottom surface of each of the head units 400a, 400b, and 400c. For example, each of the head units 400a, 400b, and 400c may have 128 or 256 discharge portions. The discharge portions may be disposed in a row at a predetermined pitch (interval). For example, the discharge portion may discharge the processing liquid on the pico-liter (pl) scale.

In addition, each of the head units 400a, 400b, and 400c has a plurality of piezoelectric elements. For example, the piezoelectric elements may be provided to be equal in number to the discharge portions. The amounts of droplets discharged from the discharge portions may be independently adjusted by controlling voltages to be applied to the piezoelectric elements.

In addition, the head moving unit 500 may be provided on the head unit 400. For example, in the case in which the three head units 400a, 400b, and 400c are installed as illustrated, three head moving units 500 may be installed so as to correspond to the head units 400a, 400b, and 400c, respectively. Alternatively, a single head moving unit 500 may be provided, and the plurality of head units 400a, 400b, and 400c may be integrally moved instead of being moved individually. The head moving unit 500 may move the head unit 400 rectilinearly in the longitudinal direction of the gantry, that is, in the second direction II or move the head unit 400 rectilinearly in the third direction III.

The control unit 700 is installed on the head moving unit 500. The control unit 700 may control whether to supply the processing liquid to the head unit 400 and control a pressure of the processing liquid, a discharge amount, and the like.

Meanwhile, the apparatus for inspecting the droplet D discharged onto the substrate S by the head unit 400 may be provided to determine whether the head unit 400 normally operates. The apparatus for inspecting the droplet D may be provided as a component of the substrate processing part 10. In addition, the apparatus for inspecting the droplet D may be provided as a component of the facility inspection part 50.

Hereinafter, the apparatus and the method for quickly and accurately inspecting the droplet D on the substrate S according to the embodiment of the present disclosure will be described. The present disclosure may measure a height of the droplet D at each position using characteristics of ultrasonic reflective waves and measure a volume of the droplet D using the measured heights. According to the embodiment of the present disclosure, it is possible to create a three-dimensional depth image using information on a height of the droplet D at each position and to measure a volume of the droplet D using the three-dimensional image. Therefore, it is possible to provide a simple hardware configuration and quickly and accurately inspect the droplet D in comparison with a measurement method in the related art (e.g., a method of inspecting a droplet by capturing an image of the droplet or a method using laser scanning). Hereinafter, the embodiment of the present disclosure will be described more specifically.

In the present specification, the ultrasonic wave means an acoustic wave having a frequency higher than a frequency (20 to 20,000 Hz) of an acoustic wave that human beings can hear. For example, the ultrasonic wave may have a frequency of 1 MHz to 30 MHz.

Figure 3:
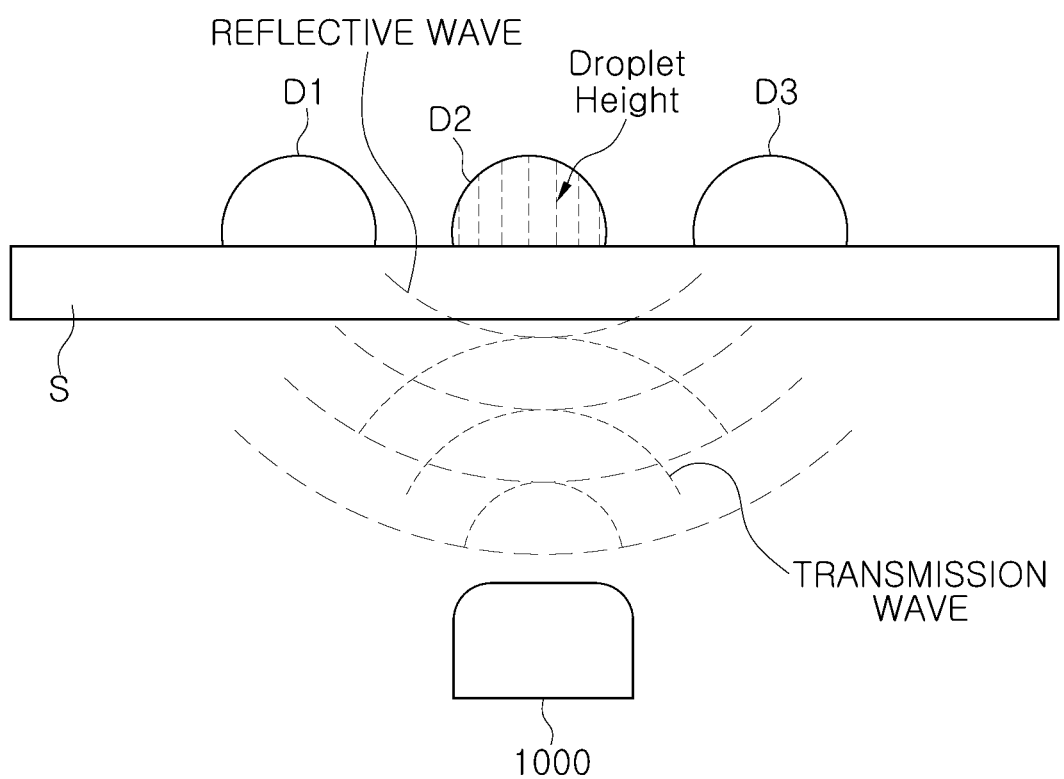
FIGS. 3 and 4 are schematic views for explaining a method of inspecting a droplet according to an embodiment of the present disclosure.
Figure 4:
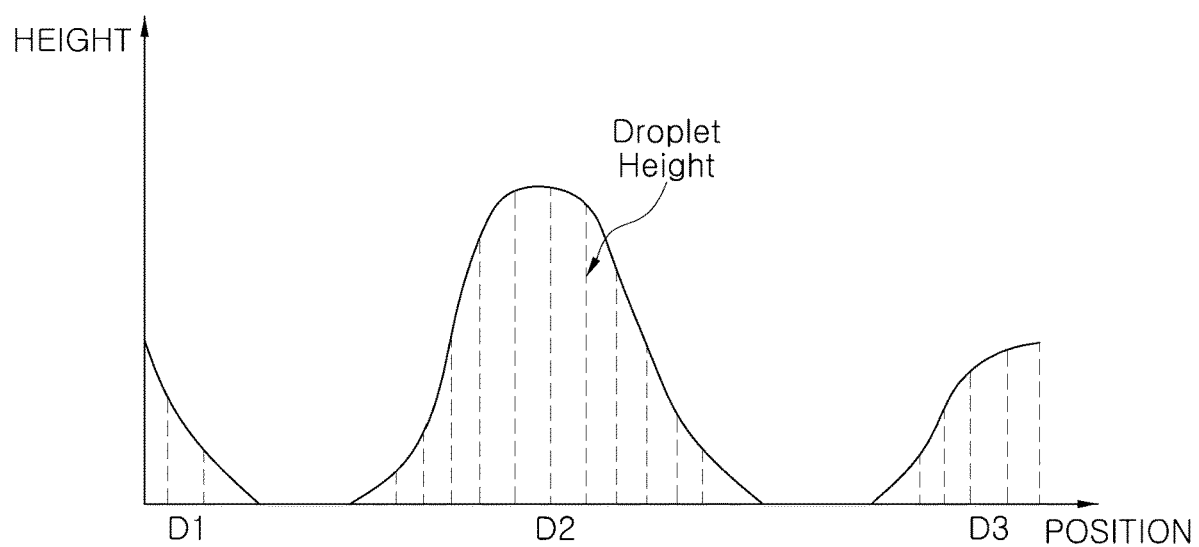

FIGS. 3 and 4 are schematic views for explaining the method of inspecting the droplet D according to the embodiment of the present disclosure.

Referring to FIG. 3, in order to inspect droplets D1, D2, and D3 positioned on the substrate S, ultrasonic waves are applied from an ultrasonic sensor 1000 positioned below the substrate S. In this case, the substrate S may be a glass sheet onto which a liquid is actually applied. Alternatively, the substrate S may be any test plate used to inspect the head unit 400.

For example, the test plate may be a substrate or film made of glass. In order to reuse the test plate, a film may be attached to an upper portion and/or a lower portion of the substrate S before the inspection of the droplet, thereby preventing damage to the test plate. In this case, the apparatus for inspecting the droplet D may additionally include a film attaching module.

The ultrasonic waves applied to the droplet D from the ultrasonic sensor 1000 are reflected by a surface of the substrate and a surface of the droplet, and the reflected ultrasonic waves are detected by the ultrasonic sensor 1000. The ultrasonic sensor 1000 may generate an ultrasonic signal corresponding to the detected ultrasonic waves, and the heights of the droplet D at the positions on the substrate S may be measured using the ultrasonic signal.

Referring to FIG. 4, the heights of the droplets D1, D2, and D3 at the positions illustrated in FIG. 3 may be represented in the form of a graph. In FIG. 4, the horizontal axis indicates positions on the substrate S, and the vertical axis indicates heights of the droplet D. In FIG. 4, the heights indicated by the dotted lines represent the heights of the droplet D measured by the ultrasonic sensor 1000. The graph in FIG. 4 may be made by applying interpolation to height values. A mathematical model for interpolation may be derived from various methods (e.g., machine learning) on the basis of a result of previously measuring the droplet D.

The volume of the droplet D may be calculated on the basis of the heights of the droplet D at the positions on the substrate S. For example, the volume of the droplet D may be calculated by summing up values made by multiplying an area corresponding to a measurement position by a measured height of the droplet D. In addition, the area of the droplet D may be calculated by integrating values in relation to the graph in FIG. 4.

In addition, a shape of the droplet D may be modeled in the form of a three-dimensional graphic image on the basis of the heights of the droplet D at the positions on the substrate S, and the shape of the droplet D may also be inspected. In this case, whether the shape of the droplet D is within a reference shape range may be checked. For example, whether a particular portion of the droplet D deviates from the reference shape range may be detected. That is, whether the shape of the droplet D is not a desired shape may be detected.

When the volume of the droplet D deviates from a reference volume range, a processor may adjust the quantity of droplets to be discharged from the head unit from which the defective droplet has been discharged. For example, when the volume of the droplet D is smaller than a reference volume, the processor may control and allow the head unit to discharge an increased amount of processing liquid. When the volume of the droplet D is larger than the reference volume, the processor may control and allow the head unit to discharge a decreased amount of processing liquid.

Figure 5A:
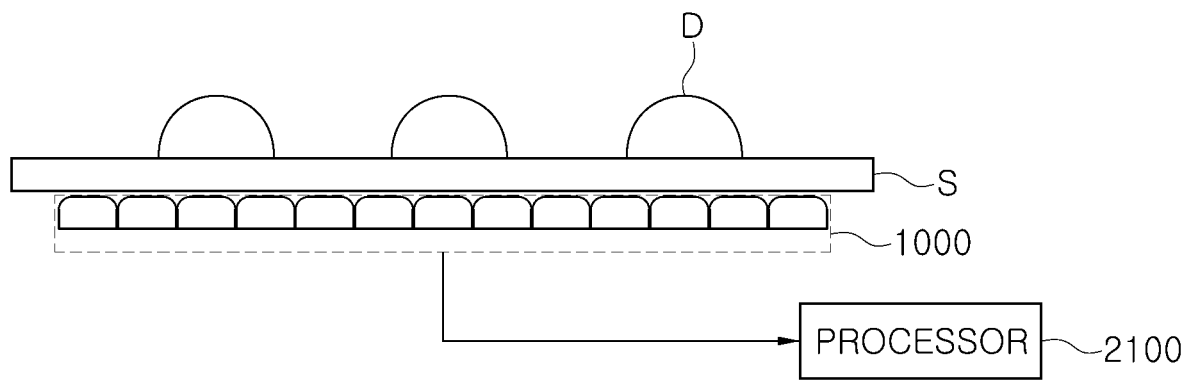
FIGS. 5A and 5B are schematic views illustrating an apparatus for inspecting a droplet according to the embodiment of the present disclosure.
Figure 5B:
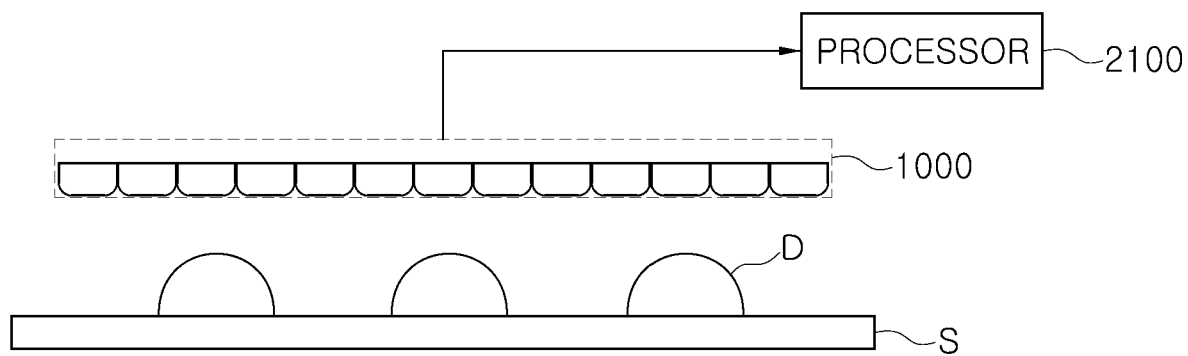

FIGS. 5A and 5B are schematic views illustrating the apparatus for inspecting a droplet according to the embodiment of the present disclosure. FIG. 5A illustrates that the ultrasonic sensor 1000 is positioned below the substrate S, and FIG. 5B illustrates that the ultrasonic sensor 1000 is positioned above the substrate S.

The apparatus for inspecting the droplet D on the substrate S according to the embodiment of the present disclosure may include: the ultrasonic sensor 1000 configured to apply ultrasonic waves (transmission waves) to the droplet D on the substrate S and detect ultrasonic waves (reflective waves) reflected from the substrate S; and the processor 2100 configured to acquire the heights of the droplet at the positions on the substrate S on the basis of the ultrasonic waves reflected from the droplet D on substrate S, calculate the volume of the droplet D on the basis of the heights of the droplet at the positions, and store or output data in relation to the volume of the droplet D.

According to the embodiment of the present disclosure, the ultrasonic sensor 1000 may be positioned below the substrate S as illustrated in FIG. 5A, or the ultrasonic sensor 1000 may be positioned above the substrate S as illustrated in FIG. 5B. As illustrated in FIG. 5A, when the ultrasonic sensor 1000 is positioned below the substrate S, it is possible to prevent the ultrasonic waves from being attenuated or distorted due to a temperature and a flow of air in a processing space. As illustrated in FIG. 5B, when the ultrasonic sensor 1000 is positioned above the substrate S, it is possible to prevent the substrate S from being damaged by the ultrasonic sensor or the ultrasonic waves. In addition, the ultrasonic sensors 1000 may be disposed both above and below the substrate S. In addition, the ultrasonic sensor 1000 may be disposed in a direction inclined with respect to the substrate.

Figure 6:
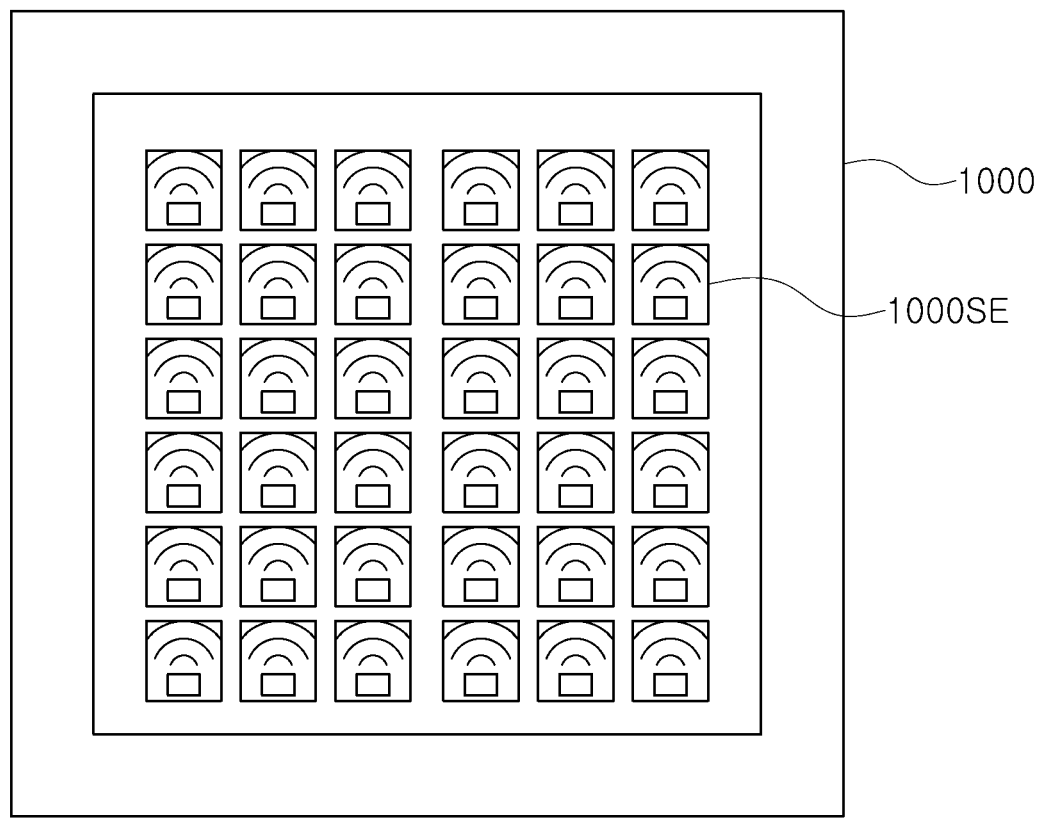
FIG. 6 is a view illustrating an example of an ultrasonic sensor according to the embodiment of the present disclosure.

FIG. 6 is a view illustrating an example of the ultrasonic sensor 1000 according to the embodiment of the present disclosure. Referring to FIG. 6, the ultrasonic sensor 1000 may include an array including M rows of ultrasonic sensor elements 1000SE and N columns of ultrasonic sensor elements 1000SE. For example, the ultrasonic sensor elements 1000SE may be arranged in an array of the M rows and the N columns. The ultrasonic elements 1000SE may include an ultrasonic transmitter 1100, an ultrasonic receiver 1200, and an ultrasonic controller 1300 of FIG. 8. That is, the ultrasonic sensor 1000 may include the one or more ultrasonic sensor elements 1100. In addition, the ultrasonic sensor 1000 may also include a controller configured to control the respective ultrasonic sensor elements 1100 or process signals generated from the ultrasonic sensor elements 1100. A function and a configuration of the ultrasonic sensor 1000 will be described below in detail.

Figure 7:
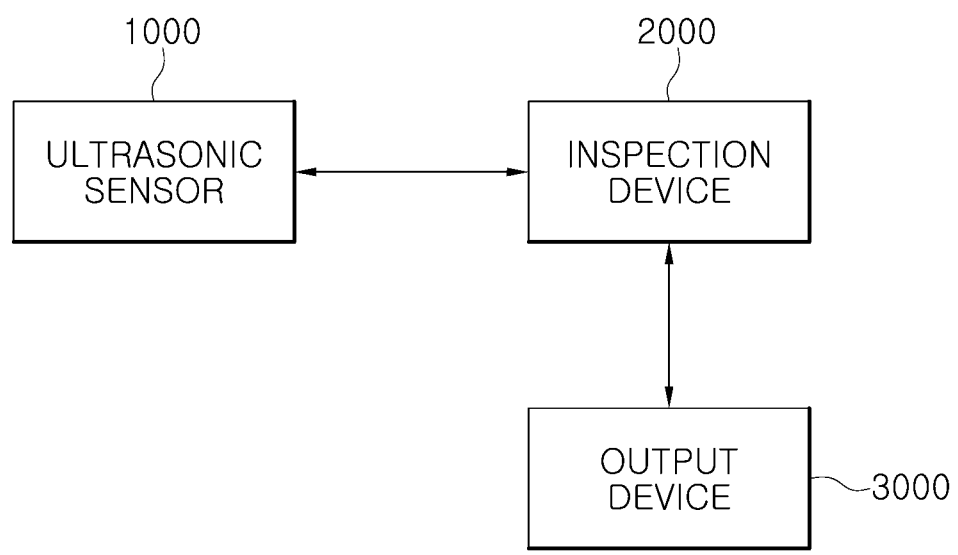
FIG. 7 is a view illustrating an example of a system for inspecting a droplet according to the embodiment of the present disclosure.

FIG. 7 is a view illustrating an example of a system for inspecting the droplet D according to the embodiment of the present disclosure. Referring to FIG. 7, the system for inspecting the droplet D may include the ultrasonic sensor 1000, an inspection device 2000, and an output device 3000. The system for inspecting the droplet D illustrated in FIG. 7 may be included in the substrate processing part 10 or the facility inspection part 50.

Referring to FIG. 7, the ultrasonic sensor 1000 applies the ultrasonic waves to the droplet D on the substrate S and detects the reflected ultrasonic waves. An ultrasonic signal corresponding to the reflected ultrasonic waves is provided to the inspection device 2000, and the inspection device 2000 may acquire the heights of the droplet at the positions on the substrate S on the basis of the reflected ultrasonic waves and calculate the volume of the droplet D on the basis of the heights of the droplet at the positions. The data in relation to the volume of the droplet D calculated by the inspection device 2000 may be stored in the inspection device 2000 or transmitted to the output device 3000 and then outputted. The output device 3000 may output, in various forms (e.g., as visual data), the data in relation to the volume of the droplet D.

Figure 8:
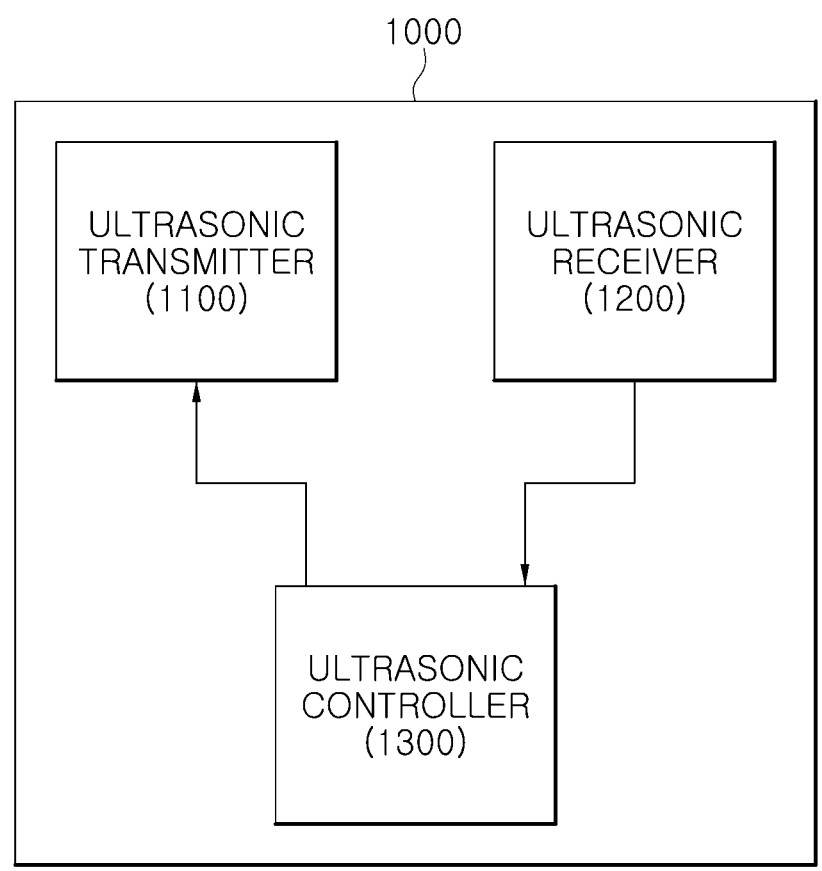
FIG. 8 is an exemplary block diagram of the ultrasonic sensor in the system for inspecting a droplet according to the embodiment of the present disclosure.

FIG. 8 is an exemplary block diagram of the ultrasonic sensor 1000 in the system for inspecting a droplet according to the embodiment of the present disclosure. FIG. 8 illustrates an example of a detailed configuration of the ultrasonic sensor 1000 illustrated in FIG. 7. Referring to FIG. 8, the ultrasonic sensor 1000 may include an ultrasonic transmitter 1100, an ultrasonic receiver 1200, and an ultrasonic controller 1300. According to the embodiment, the ultrasonic transmitter 1100 and the ultrasonic receiver 1200 may be configured as a single module, and the module may be referred to as an ultrasonic transceiver. In addition, the ultrasonic sensor 1000 may further include a battery or a power receiver configured to supply power.

The ultrasonic transmitter 1100 refers to a device for generating and outputting ultrasonic waves. The ultrasonic transmitter 1100 may convert an electrical signal provided from the ultrasonic controller 1300 into ultrasonic waves and outputs the ultrasonic waves. The ultrasonic transmitter 1100 may be implemented by a piezoelectric transducer, a capacitive transducer, or a diaphragm for generating the ultrasonic waves.

The ultrasonic receiver 1200 refers to a device for detecting the ultrasonic waves. The ultrasonic receiver 1200 may convert the received ultrasonic waves into an electrical signal and provide the electrical signal to the ultrasonic controller 1300.

The ultrasonic controller 1300 may control an overall operation of the ultrasonic sensor 1000. For example, the ultrasonic controller 1300 may provide the electrical signal to the ultrasonic transmitter 1100 to allow the ultrasonic transmitter 1100 to output the ultrasonic waves. The ultrasonic controller 1300 may receive the electrical signal provided from the ultrasonic receiver 1200 and convert the electrical signal into a signal to be outputted. For example, the ultrasonic controller 1300 may convert an analog signal corresponding to the ultrasonic waves into a digital signal and outputs the digital signal.

Figure 9:
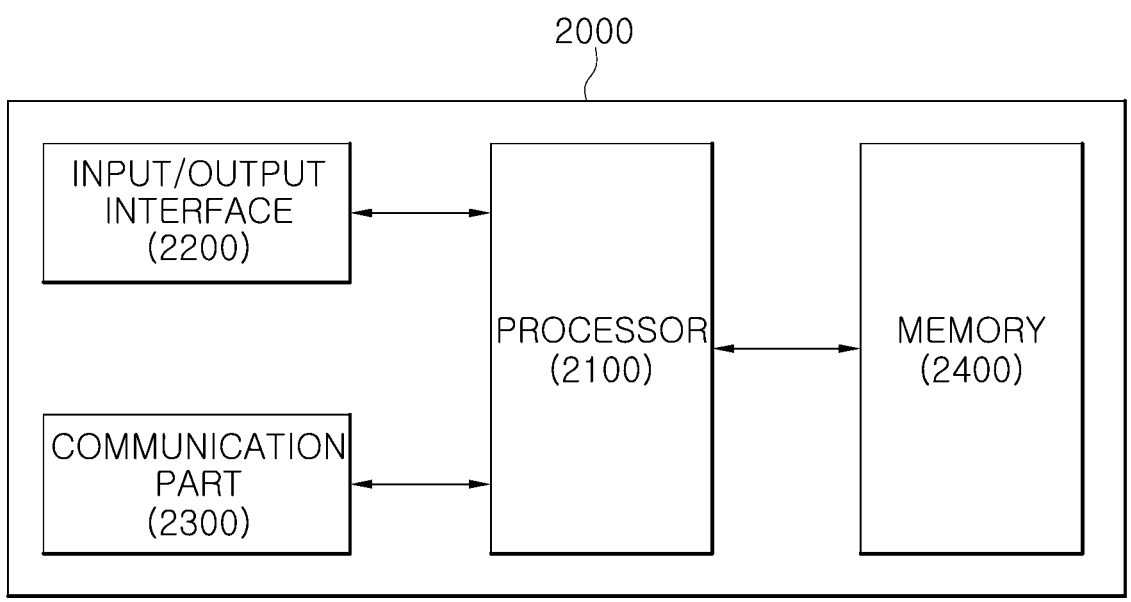
FIG. 9 is an exemplary block diagram of an inspection device in the system for inspecting a droplet according to the embodiment of the present disclosure.

FIG. 9 is an exemplary block diagram of the inspection device 2000 in the system for inspecting a droplet according to the embodiment of the present disclosure. FIG. 9 illustrates an example of a detailed configuration of the inspection device 2000 illustrated in FIG. 7. Referring to FIG. 9, the inspection device 2000 may include an input/output interface 2200, the processor 2100, a communication part 2300, and a memory 2400.

The input/output interface 2200 refers to a device that interfaces with another entity such as the ultrasonic sensor 1000 or the output device 3000. For example, the inspection device 2000 may receive the information on the reflected ultrasonic waves from the ultrasonic sensor 1000 through the input/output interface 2200 or provide the output device 3000 with data in relation to a result of inspecting the droplet D (e.g., a volume and a shape of the droplet D).

The communication part 2300 refers to a device that transmits or receives a signal through a wired or wireless channel. The inspection device 2000 may provide another device with the data in relation to the result of inspecting the droplet D through the communication part. In addition, in a case in which the ultrasonic sensor 1000 has a communication module (e.g., a Bluetooth or Wi-Fi module), the inspection device 2000 may receive, through the communication part 2300, the ultrasonic signal received from the ultrasonic sensor 1000.

The processor 2100 may control the calculation for inspecting the droplet D and control the overall operation of the inspection device 2000. For example, the processor 2100 may derive the heights of the droplet D at the positions on the substrate S on the basis of the ultrasonic signal provided from the ultrasonic sensor 1000 and calculate the volume of the droplet D on the basis of the heights of the droplet D at the positions. In addition, the processor 2100 may store, in the memory 2400, the data in relation to the inspection of the droplet D or control the input/output interface 2200 or the communication part 2300 to output the data through the output device 3000. The processor 2100 may include one or more processing circuits.

The memory 2400 may store information to be processed by the inspection device 2000. The memory 2400 may include a volatile memory (e.g., a DRAM) and/or a non-volatile memory (e.g., a flash memory). The memory 2400 may store the data (e.g., the volume) in relation to the inspection of the droplet D or store the information to be used to inspect the droplet D. In addition, the memory 2400 may store one or more instructions to be executed by the processor 2100 to inspect the droplet D.

Figure 10:
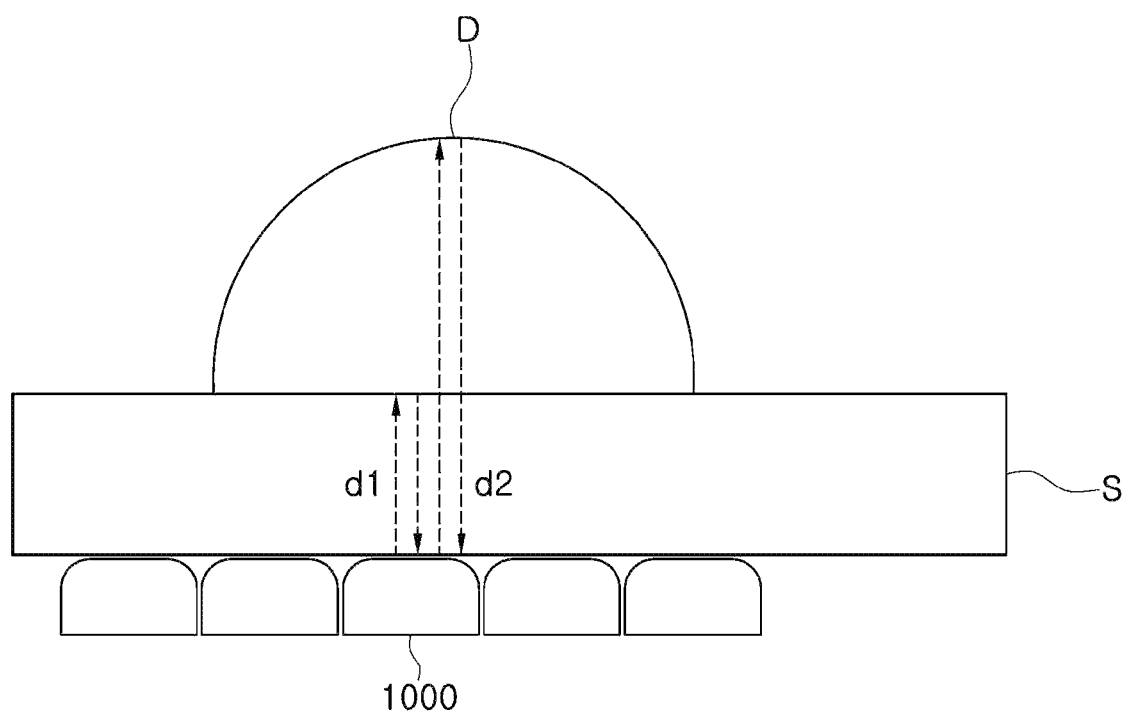
FIG. 10 is a view for explaining an example of a method of calculating a height of a droplet at each position according to the embodiment of the present disclosure.

FIG. 10 is a view for explaining an example of a method of calculating a height of a droplet at each position according to the embodiment of the present disclosure.

According to the embodiment of the present disclosure, the reflected ultrasonic signal may include first ultrasonic waves d1 reflected from a surface of the substrate S and second ultrasonic waves d2 reflected from a surface of the droplet D. The heights of the droplet D may be acquired on the basis of the second ultrasonic waves d2.

As illustrated in FIG. 10, some of the ultrasonic waves transmitted from the ultrasonic sensor 1000 are reflected by the surface of the substrate S, and the remaining ultrasonic waves having passed through the substrate S are reflected by the surface of the droplet D. Because the substrate S has a constant thickness, a distance measured on the basis of the ultrasonic waves d1 reflected by the surface of the substrate S is constant, and the distance may be known in advance. However, a distance measured on the basis of the ultrasonic waves d2 reflected by the surface of the droplet D varies depending on positions. That is, in the case in which the thickness of the substrate S is known in advance, the height of the droplet D may be calculated by subtracting the thickness of the substrate S from the distance measured on the basis of the ultrasonic waves d2 reflected from the surface of the droplet D. In a case in which the ultrasonic sensor 1000 is spaced apart from a lower surface of the substrate S at a predetermined distance, there may be ultrasonic waves which are reflected by the lower surface of the substrate S. Even in this case, because a distance between the ultrasonic sensor 1000 and the lower surface of the substrate S is constant, the height of the droplet D may be calculated by subtracting the distance between the ultrasonic sensor 1000 and the upper surface of the substrate S from the distance measured on the basis of the ultrasonic waves d2 reflected from the surface of the droplet D.

Figure 11:
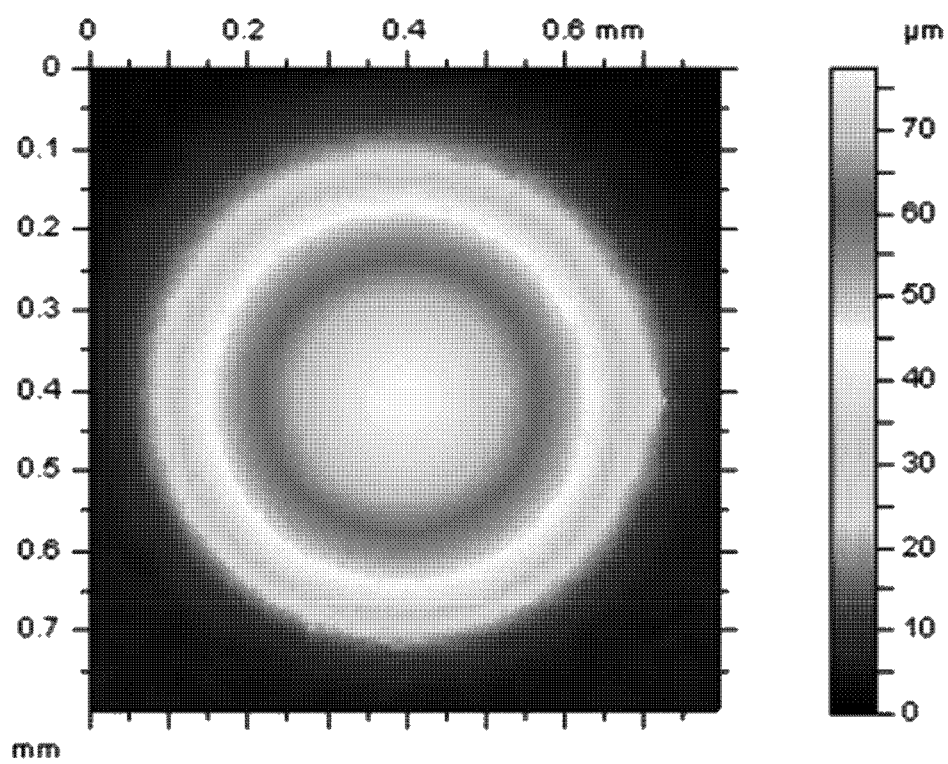
FIGS. 11 and 12 are views illustrating an example of a process of generating a three-dimensional graphic image on the basis of heights of a droplet at respective positions according to the embodiment of the present disclosure.
Figure 12:
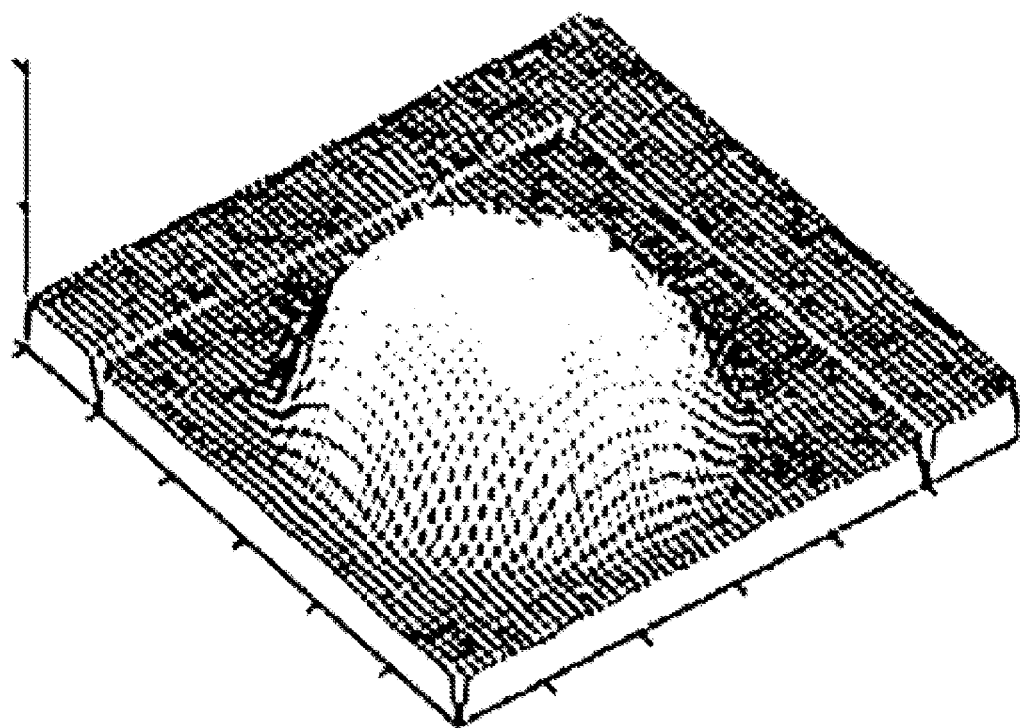

FIGS. 11 and 12 are views illustrating an example of a process of generating a three-dimensional graphic image on the basis of heights of a droplet at respective positions according to the embodiment of the present disclosure.

According to the embodiment of the present disclosure, the processor 2100 may control the amount of liquid to be discharged by creating a three-dimensional graphic image corresponding to a shape of the droplet D on the basis of values of the heights of the droplet D at the two-dimensional positions on the substrate S, calculating a volume of the three-dimensional graphic image corresponding to the shape of the droplet D, and comparing the calculated volume with the reference volume.

According to the embodiment of the present disclosure, the processor 2100 may model the three-dimensional graphic image corresponding to the shape of the droplet D by creating a three-dimensional graph indicating the values of the heights of the droplet D at the two-dimensional positions on the substrate S and applying the interpolation to the adjacent values of the heights in the three-dimensional graph.

For example, as illustrated in FIG. 11, a depth image representing the values of the heights of the droplet D at the positions is created, and a three-dimensional graphic image illustrated in FIG. 12 may be created on the basis of the depth image illustrated in FIG. 11. In a case in which the heights of the droplet D at the positions are discontinuous, the interpolation may be applied to the values of the heights to create the three-dimensional graphic image.

Figure 13:
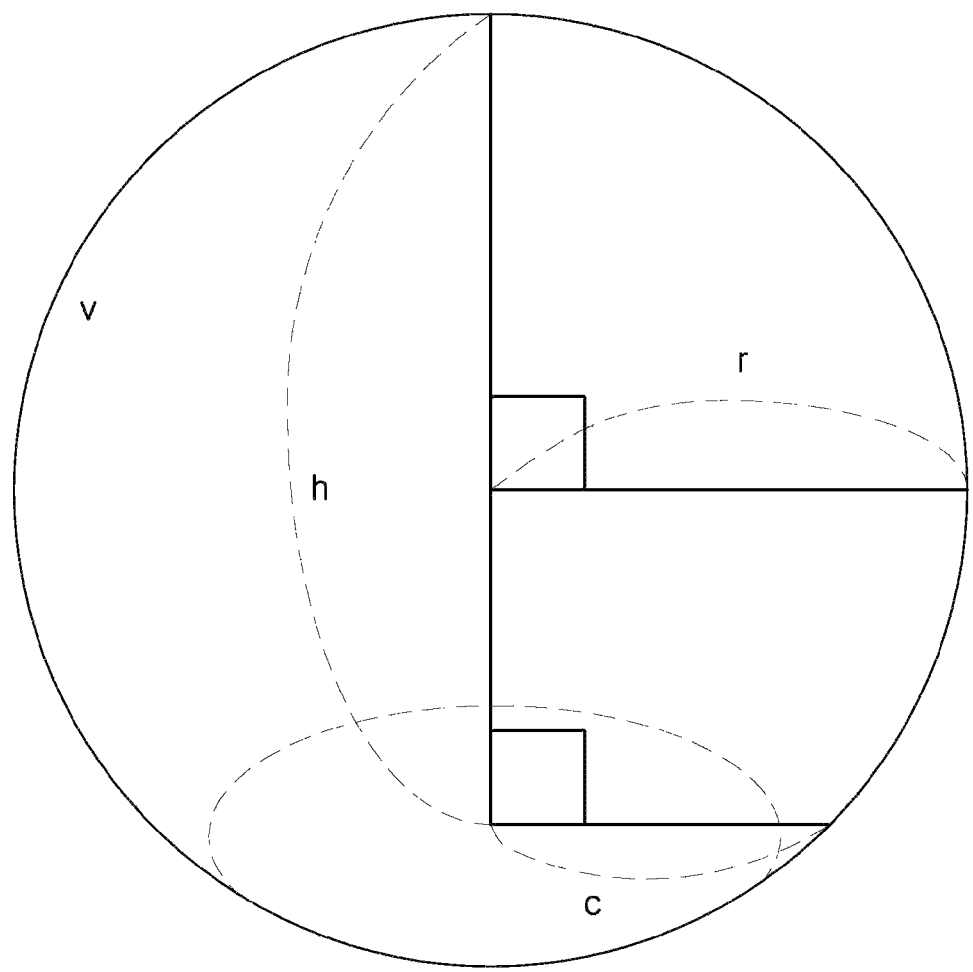
FIG. 13 is a view for explaining an example of a method of calculating a volume of a droplet according to the embodiment of the present disclosure.

FIG. 13 is a view for explaining an example of a method of calculating the volume of the droplet D according to the embodiment of the present disclosure.

The volume of the droplet D may be calculated on the basis of the three-dimensional image of the droplet D which is created as illustrated in FIG. 12. For example, in a case in which the droplet D is modeled as a figure illustrated in FIG. 13, the volume of the droplet D may be calculated on the basis of the following Equation 1.

$$V = \pi/6 h(3c^2 + r^2) \qquad \text{[Equation 1]}$$

In Equation 1, V represents a volume, h represents a height, r represents a radius of a sphere, and c represents a radius of a bottom surface.

Figure 14:
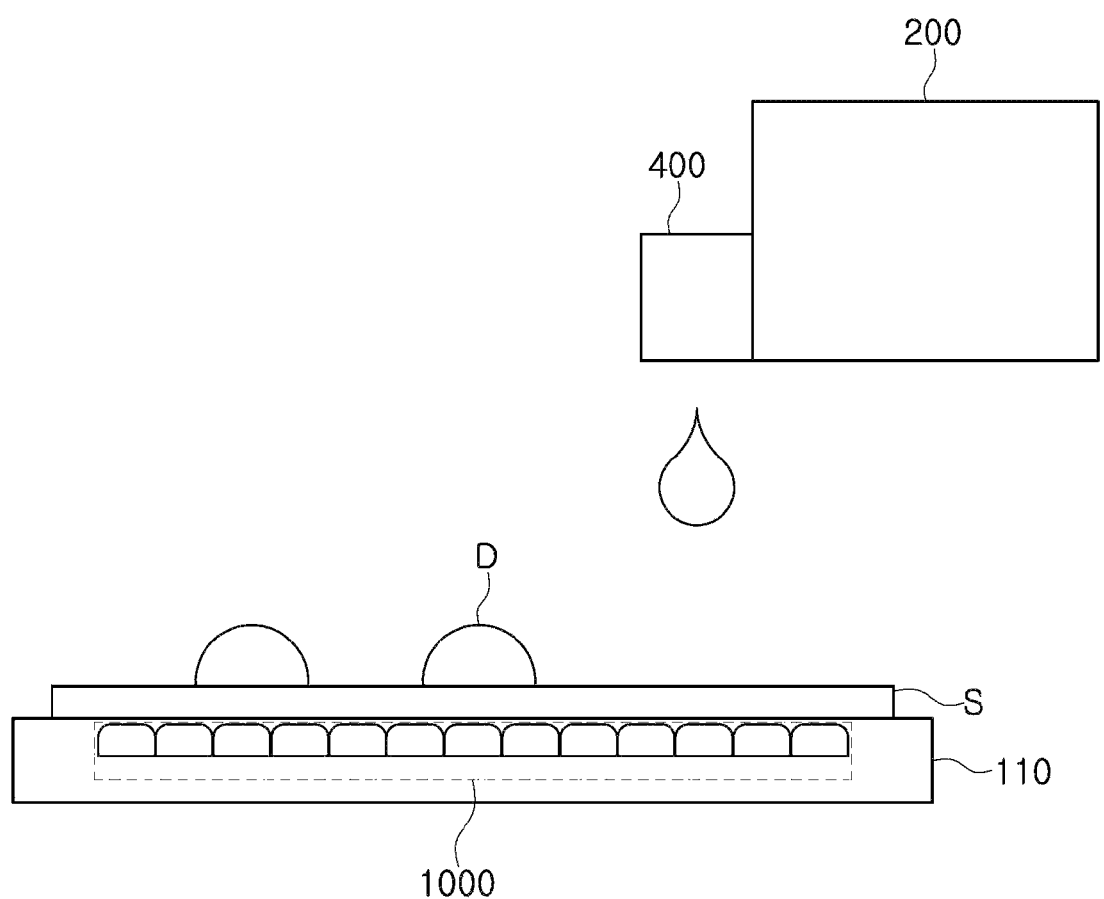
FIG. 14 is a view illustrating an example of a method of inspecting a droplet using an ultrasonic sensor disposed in a support unit according to the embodiment of the present disclosure.

FIG. 14 is a view illustrating an example of a method of inspecting the droplet D using the ultrasonic sensor 1000 disposed in the support unit 110 according to the embodiment of the present disclosure.

According to the embodiment of the present disclosure, the ultrasonic sensor 1000 may be installed in the support unit that supports a lower portion of the substrate S in the substrate processing part 10.

Referring to FIG. 14, the droplets D are formed on an upper portion of the substrate S by the head unit 400 coupled to the gantry 200 while the substrate S moves in the state in which the substrate S is seated on the support unit 110. In this case, the droplet D positioned on the substrate S is inspected by the ultrasonic sensor 1000 installed in the support unit 110. When a droplet having a volume or a shape deviating from the reference range is detected, it may be determined that the head unit 400 is abnormal.

FIGS. 15, and 16A to 16C are views illustrating an example of a method of inspecting a droplet using an inspection operating part according to the embodiment of the present disclosure.

According to the embodiment of the present disclosure, an inspection operating part may be further provided to position the ultrasonic sensor 1000 below the substrate S onto which the droplet D is discharged. In the embodiment, the inspection operating part includes a horizontal drive part 4000 configured to convey the substrate S to an inspection zone IZ in which the droplet D is inspected, and a vertical drive part 5000 moves upward the ultrasonic sensor 1000 positioned below the substrate S positioned in the inspection zone IZ so that the ultrasonic sensor 1000 comes into contact with the lower portion of the substrate S.

In the embodiment, the horizontal drive part 4000 may include a gripper 4200 configured to hold a lateral portion of the substrate S, and a conveyance guide 4100 configured to guide a movement of the gripper 4200. In addition, a driving source (not illustrated) for moving the gripper 4200 may be provided. In addition, the vertical drive part 5000 may include an ultrasonic sensor support unit 5100 configured to support the ultrasonic sensor 1000, and a lifting shaft 5200 configured to define a route along which the ultrasonic sensor support unit 5100 moves upward or downward. In addition, a driving source for moving the ultrasonic sensor support unit 5100 upward or downward may be provided.

Figure 15:
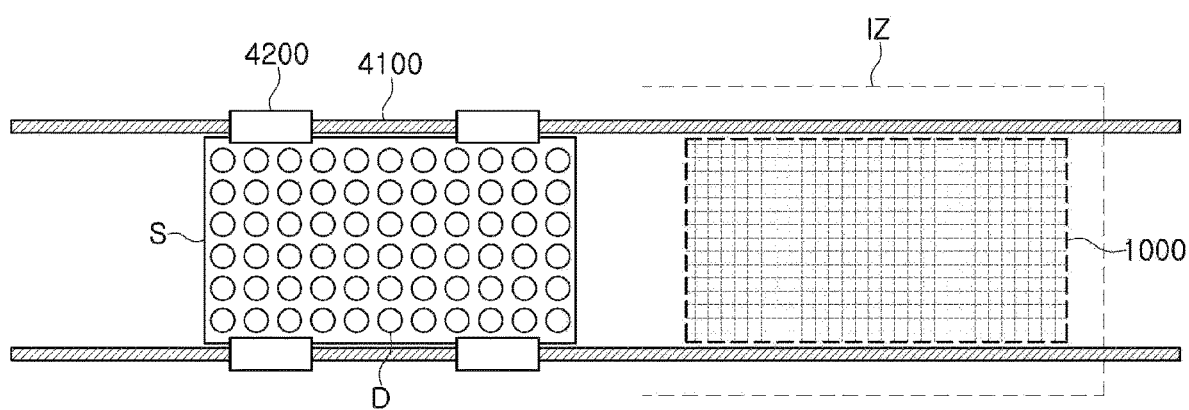
FIGS. 15, and 16A to 16C are views illustrating an example of a method of inspecting a droplet using an inspection operating part according to the embodiment of the present disclosure.

For example, as illustrated in FIG. 15, the substrate S onto which the droplet D is discharged may be held by the gripper 4200 and conveyed to the droplet inspection zone IZ by the conveyance guide 4100 coupled to the gripper 4200. The ultrasonic sensor 1000 may be positioned below the droplet inspection zone IZ.

Figure 16A:
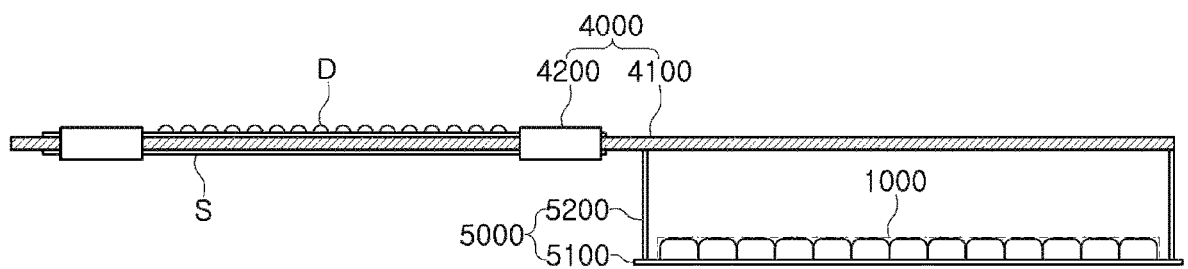
Figure 16B:
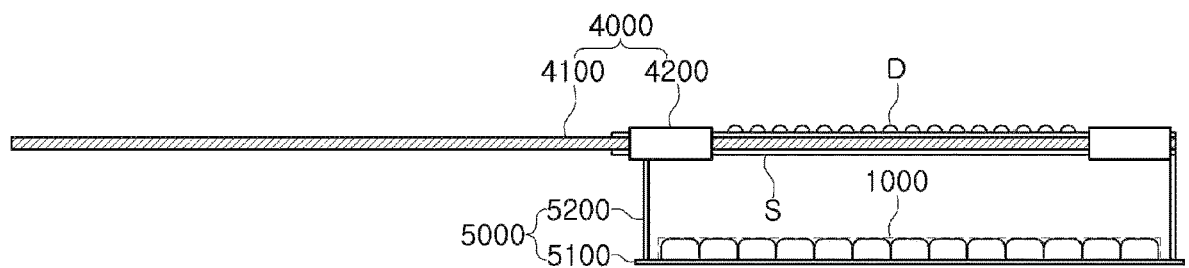
Figure 16C:
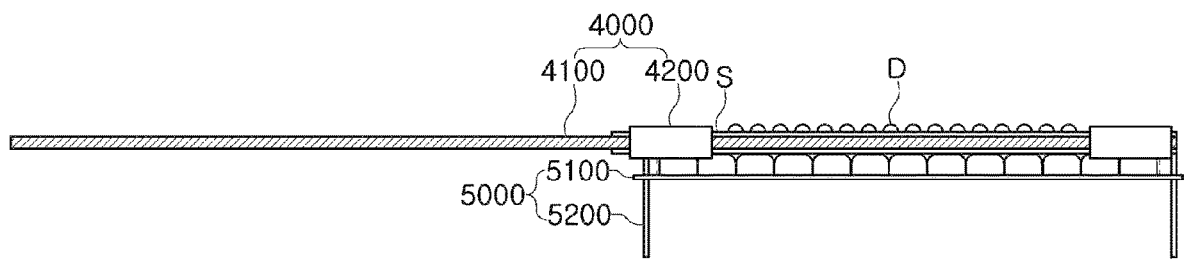

Referring to FIGS. 16A to 16C, the substrate S onto which the droplets D are discharged is held by the gripper 4200 (FIG. 16A), the gripper 4200 moves along the conveyance guide 4100 such that the substrate S is positioned in the inspection zone IZ (FIG. 16B), the ultrasonic sensor 1000 positioned on the ultrasonic sensor support unit 5100 disposed below the substrate is moved upward along the lifting shaft 5200, such that the ultrasonic sensor 1000 comes into contact with the lower portion of the substrate S (FIG. 16C).

Then, the droplets D may be inspected by applying the ultrasonic waves to the lower portion of the substrate S onto which the droplets D are discharged.

The droplet inspection device illustrated in FIGS. 15 and 16A to 16C may be included in the facility inspection part 50. In addition, the droplet inspection device illustrated in FIGS. 15 and 16A to 16C may be provided in the substrate processing part 10. In this case, the droplet inspection device may be provided at an end of the substrate processing part 10 in the first direction I in FIG. 2.

Figure 17:
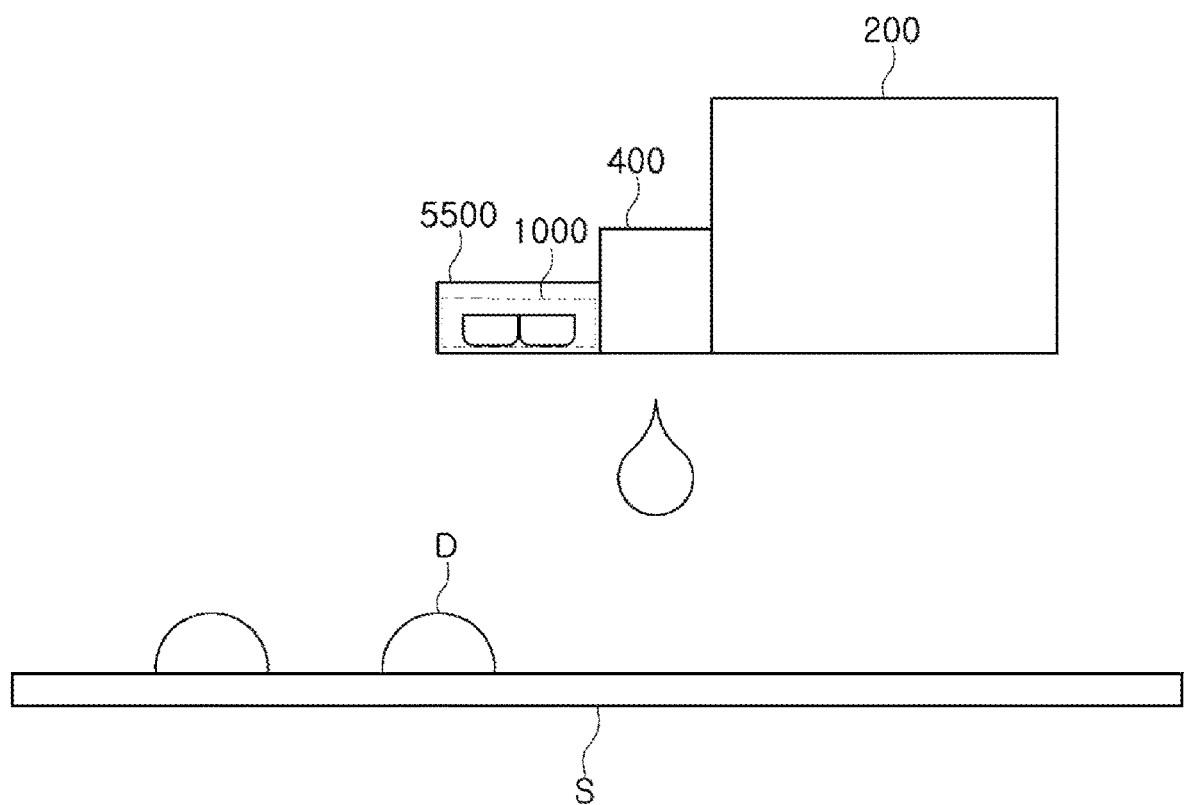
FIG. 17 is a view illustrating an example of a method of inspecting a droplet using an ultrasonic sensor installed on a head unit according to the embodiment of the present disclosure.

FIG. 17 is a view illustrating an example of a method of inspecting the droplet D using the ultrasonic sensor 1000 installed on the head unit 400 according to the embodiment of the present disclosure.

According to the embodiment of the present disclosure, the ultrasonic sensor 1000 may be installed on the head unit 400 that discharges the droplet D. For example, as illustrated in FIG. 17, the ultrasonic sensor 1000 may be installed in an attachment 5500 provided on a front portion of the head unit 400. Alternatively, the ultrasonic sensor 100 may be installed on a lateral surface of the head unit 400. The ultrasonic sensor 1000 applies the ultrasonic waves to the droplet D discharged from the head unit 400, detects the reflected ultrasonic waves, and generates the ultrasonic signal. The volume and/or the shape of the droplet D may be inspected on the basis of the ultrasonic signal.

Figure 18:
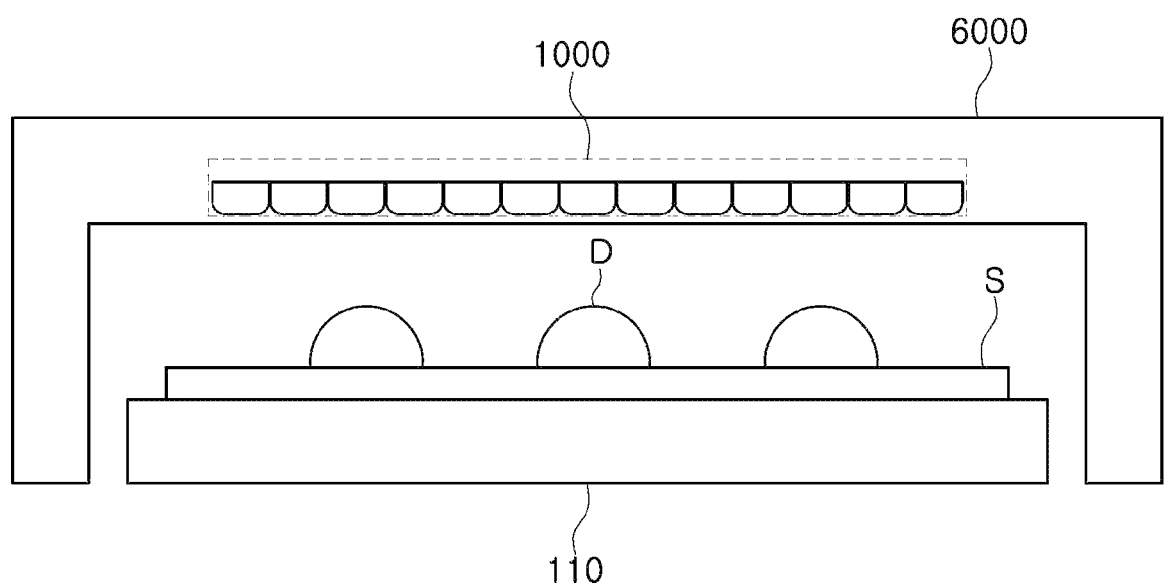
FIG. 18 is a view illustrating an example of a method of inspecting a droplet using an ultrasonic sensor installed on an upper structure according to the embodiment of the present disclosure.

FIG. 18 is a view illustrating an example of a method of inspecting a droplet using an ultrasonic sensor installed on an upper structure according to the embodiment of the present disclosure.

According to the embodiment of the present disclosure, the ultrasonic sensor 1000 may be installed in a structure positioned above the substrate S. For example, as illustrated in FIG. 18, an structure 6000, in which the ultrasonic sensor 1000 is installed, may be provided above the substrate S, and the ultrasonic sensor 1000 installed in the upper structure 6000 provided above the substrate S may apply the ultrasonic waves to the droplet D. The upper structure 6000 may be identical to the gantry 200 illustrated in FIG. 2 or may be a separate gantry. The upper structure 6000 illustrated in FIG. 18 may be coupled to the gantry 200 illustrated in FIG. 2, such that the upper structure 6000 may move together with the gantry 200. In addition, the upper structure 6000 illustrated in FIG. 18 may be a separate stationary gantry. The upper structure 6000 may include a driving source and a movement guide that enable the ultrasonic sensor 1000 to move.

The droplet inspection device illustrated in FIG. 18 may be included in the facility inspection part 50. The droplet inspection device illustrated in FIG. 18 may be provided in the substrate processing part 10. In this case, the droplet inspection device may be provided at an end of the substrate processing part 10 in the first direction I in FIG. 2.

Figure 19:
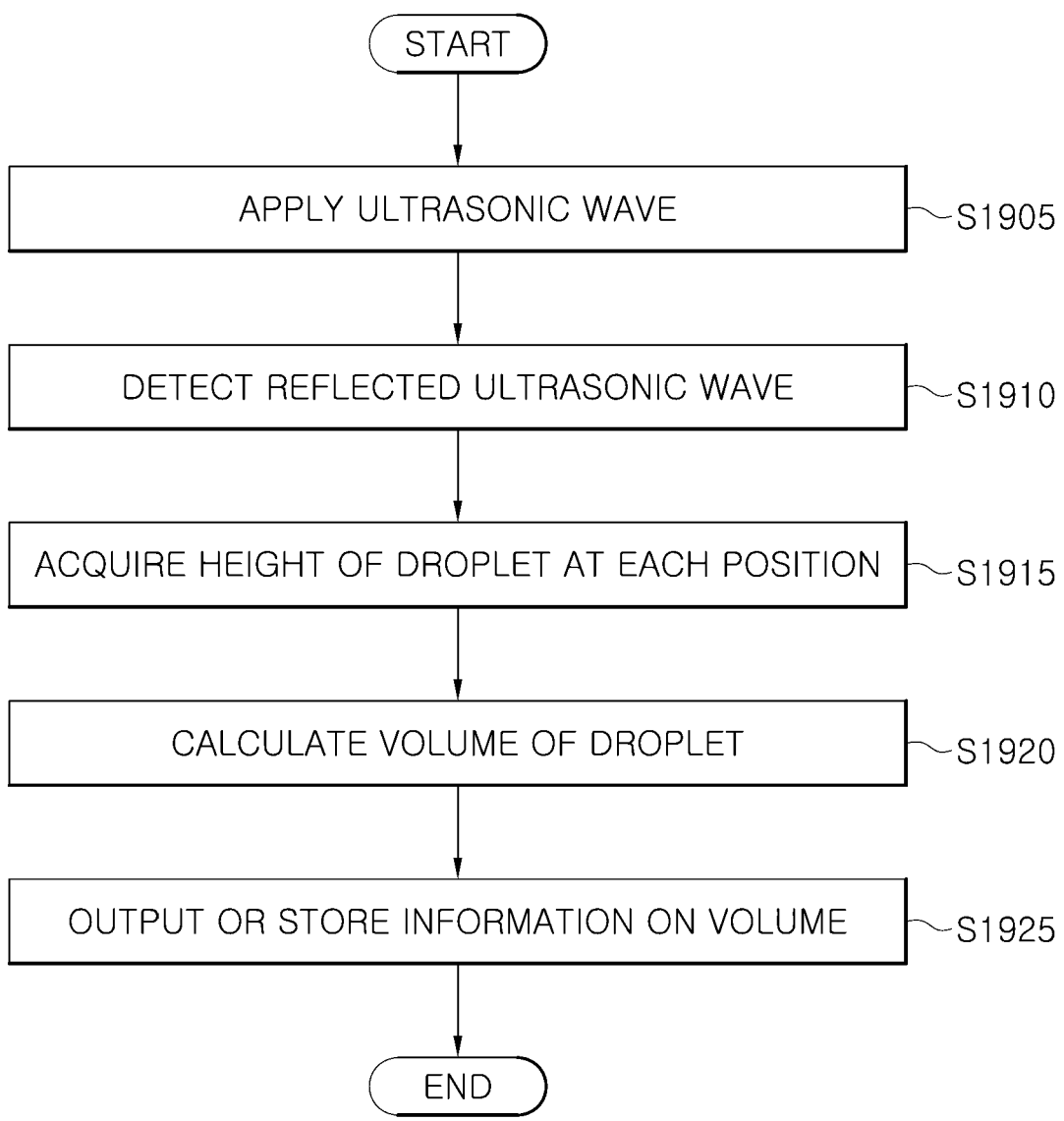
FIG. 19 is a flowchart illustrating a method of inspecting a droplet according to the embodiment of the present disclosure.

FIG. 19 is a flowchart illustrating a method of inspecting a droplet according to the embodiment of the present disclosure. The operations illustrated in FIG. 19 may be performed by the inspection device 2000 (the processor 2100).

The method of inspecting the droplet D on the substrate S according to the embodiment of the present disclosure may include applying the ultrasonic waves to the droplet D on the substrate S (S1905), detecting the ultrasonic waves reflected from the substrate S (S1910), acquiring the heights of the droplet at the positions on the substrate S on the basis of the reflected ultrasonic waves (S1915), calculating the volume of the droplet D on the basis of the heights of the droplet D at the positions (S1920), and storing or outputting the data in relation to the volume of the droplet D (S1925).

In the embodiment, the calculating of the volume of the droplet D may include creating the three-dimensional graphic image corresponding to the shape of the droplet D on the basis of values of the heights of the droplet D at the two-dimensional positions on the substrate S, and calculating the volume of the three-dimensional graphic image corresponding to the shape of the droplet D.

In the embodiment, the creating of the three-dimensional graphic image corresponding to the shape of the droplet D may include creating the three-dimensional graph representing the values of the heights of the droplet D at the two-dimensional positions on the substrate S, and modeling the three-dimensional graphic image corresponding to the shape of the droplet D by applying the interpolation to the adjacent values of the heights in the three-dimensional graph.

In the embodiment, the method of inspecting a droplet may further include determining whether the shape of the droplet D is within a reference shape range on the basis of the three-dimensional graphic image.

In the embodiment, the applying of the ultrasonic waves to the droplet on the substrate S may include positioning the ultrasonic sensor 1000 below the substrate S onto which the droplet D is discharged and applying the ultrasonic waves to the droplet D from the ultrasonic sensor 1000.

In the embodiment, the positioning of the ultrasonic sensor below the substrate S may include conveying the substrate S to the inspection zone in which the droplet D is inspected and moving upward the ultrasonic sensor 1000 positioned below the substrate S positioned in the inspection zone to bring the ultrasonic sensor 1000 into contact with a lower portion of the substrate.

In addition, the processing method to which the present disclosure is applied can be produced in the form of a program that is executed on a computer, and the processing method may be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. For example, the computer-readable recording media may include Blu-ray discs (BD), Universal Serial Bus (USB), ROM, PROM, EPROM, EEPROM, RAM, CD-ROM, magnetic tapes, floppy discs, and optical data storage devices. In addition, the computer-readable recording media include media implemented in the form of reflective waves (e.g., transmission over the Internet). In addition, bitstreams generated by encoding methods may be stored in the computer-readable recording medium or transmitted through a wired/wireless communication network.

In addition, the embodiment of the present disclosure may be implemented as computer program products by program codes, and the program code may be executed on the computer by the embodiment of the present disclosure. The program code may be stored in a computer-readable carrier.

A non-transitory computer-readable medium according to the embodiment of the present disclosure stores one or more instructions executed by one or more processors. The instructions for performing the method of inspecting the droplet D according to the embodiment of the present disclosure may be stored in the non-transitory computer-readable medium.

The present embodiments and the drawings attached to the present specification clearly show only a part of the technical spirit included in the present disclosure. It will be apparent that all the modified examples and the specific embodiments, which may be easily inferred by those skilled in the art within the scope of the technical spirit included in the specification and the drawings of the present disclosure, are included in the scope of the present disclosure.

Accordingly, the spirit of the present disclosure should not be limited to the described embodiment, and all of the equivalents or equivalent modifications of the claims as well as the appended claims belong to the scope of the spirit of the present disclosure.

What is claimed is:

1. An apparatus for inspecting a droplet on a substrate, the apparatus comprising:
   an ultrasonic transmitter configured to apply an ultrasonic wave to a droplet on the substrate;
   an ultrasonic receiver configured to detect an ultrasonic wave reflected from the droplet on the substrate and convert the detected ultrasonic wave to an electrical signal; and
   a processor configured to acquire a plurality of heights of the droplet at a plurality of positions on the substrate on the basis of the electrical signal that is received from the ultrasonic receiver, calculate a volume of the droplet on the basis of the plurality of heights of the droplet at the plurality of positions, and store or output data in relation to the volume of the droplet.

2. The apparatus of claim 1,
   wherein the processor creates a three-dimensional graphic image corresponding to a shape of the droplet on the basis of the plurality of heights of the droplet at the plurality of positions on the substrate, calculates a volume of the three-dimensional graphic image corresponding to the shape of the droplet, and controls an amount of liquid to be discharged toward the substrate by comparing the volume with a reference volume, and
   wherein the plurality of positions are represented by two dimensional coordinates.

3. The apparatus of claim 2,
   wherein the processor creates a three-dimensional graph representing the plurality of heights of the droplet at the plurality of positions on the substrate, and models the three-dimensional graphic image corresponding to the shape of the droplet by applying interpolation to two adjacent heights of the plurality of heights in the three-dimensional graph.

4. The apparatus of claim 2,
   wherein the processor determines whether the shape of the droplet is within a reference shape range on the basis of the three-dimensional graphic image.

5. The apparatus of claim 1,
   wherein the ultrasonic transmitter and the ultrasonic receiver are positioned below the substrate.

6. The apparatus of claim 5,
   wherein the ultrasonic transmitter and the ultrasonic receiver are installed in a support unit configured to support the substrate.

7. The apparatus of claim 5, further comprising:
   an inspection operating part configured to position the ultrasonic transmitter and the ultrasonic receiver below the substrate onto which the droplet is discharged.

8. The apparatus of claim 7,
   wherein the inspection operating part comprises:
   a horizontal drive part configured to convey the substrate to an inspection zone in which the droplet is inspected; and
   a vertical drive part configured to move upward the ultrasonic transmitter and the ultrasonic receiver positioned below the substrate positioned in the inspection zone so that the ultrasonic transmitter and the ultrasonic receiver contact a lower portion of the substrate.

9. The apparatus of claim 1,
   wherein the ultrasonic transmitter and the ultrasonic receiver are positioned above the substrate.

10. The apparatus of claim 9,
    wherein the ultrasonic transmitter and the ultrasonic receiver are installed on a head unit configured to discharge the droplet or installed on a structure positioned above the substrate.

11. A method of inspecting a droplet on a substrate, the method comprising:
    applying, using an ultrasonic transmitter, an ultrasonic wave to a droplet on the substrate;
    detecting, using an ultrasonic receiver, an ultrasonic wave reflected from the droplet on the substrate and converting the detected ultrasonic wave to an electrical signal;
    acquiring a plurality of heights of the droplet at a plurality of positions on the substrate on the basis of the electrical signal received from the ultrasonic receiver;
    calculating a volume of the droplet on the basis of the plurality of heights of the droplet at the plurality of positions; and
    storing or outputting data in relation to the volume of the droplet.

12. The method of claim 11,
    wherein the calculating of the volume of the droplet comprises:
    creating a three-dimensional graphic image corresponding to a shape of the droplet on the basis of the plurality of heights of the droplet at the plurality of positions on the substrate;
    calculating a volume of the three-dimensional graphic image corresponding to the shape of the droplet; and
    controlling an amount of liquid to be discharged toward the substrate by comparing the volume with a reference volume, and
    wherein the plurality of positions are represented by two dimensional coordinates.

13. The method of claim 12,
    wherein the creating of the three-dimensional graphic image corresponding to the shape of the droplet comprises:
    creating a three-dimensional graph representing the plurality of heights of the droplet at the plurality of positions on the substrate; and
    modeling the three-dimensional graphic image corresponding to the shape of the droplet by applying interpolation to two adjacent heights of the plurality of heights in the three-dimensional graph.

14. The method of claim 12, further comprising:
    determining whether the shape of the droplet is within a reference shape range on the basis of the three-dimensional graphic image.

15. The method of claim 11,
    wherein the applying of the ultrasonic wave to the droplet on the substrate comprises:
    positioning an ultrasonic transmitter and an ultrasonic receiver below the substrate onto which the droplet is discharged; and
    applying the ultrasonic wave to the droplet from the ultrasonic transmitter and the ultrasonic receiver.

16. The method of claim 15, wherein the positioning of the ultrasonic transmitter and the ultrasonic receiver below the substrate comprises:
    conveying the substrate to an inspection zone in which the droplet is inspected; and moving upward the ultrasonic transmitter and the ultrasonic receiver positioned below the substrate positioned in the inspection zone so that the ultrasonic transmitter and the ultrasonic receiver contact a lower portion of the substrate.

17. An inkjet printing facility comprising:

a substrate loading part configured to load a substrate;

a substrate conveying part configured to convey the substrate;

a substrate processing part comprising a support unit on which the substrate is seated, a head unit configured to discharge a droplet onto the substrate seated on the support unit, and a gantry to which the head unit is movably coupled;

a facility inspection part configured to inspect a module comprised in the substrate processing part;

an apparatus for inspecting the droplet discharged by the head unit, the apparatus being comprised in the substrate processing part or the facility inspection part; and a substrate unloading part configured to unload the substrate, wherein the apparatus for inspecting the droplet comprises:

an ultrasonic sensor configured to apply an ultrasonic wave to the droplet from above or below the substrate, detect an ultrasonic wave reflected from the droplet on the substrate, and convert the detected ultrasonic wave to an electrical signal; and a processor configured to acquire a plurality of heights of the droplet at a plurality of positions on the substrate on the basis of the electrical signal that is received from the ultrasonic sensor, calculate a volume of the droplet on the basis of the plurality of heights of the droplet at the plurality of positions, and output or store data in relation to the volume of the droplet.

18. The inkjet printing facility of claim 17, wherein the processor creates a three-dimensional graphic image corresponding to a shape of the droplet on the basis of the plurality of heights of the droplet at the plurality of positions on the substrate, calculates a volume of the three-dimensional graphic image corresponding to the shape of the droplet, and controls an amount of liquid to be discharged toward the substrate by comparing the volume with a reference volume, and wherein the plurality of positions are represented by two dimensional coordinates.

19. The inkjet printing facility of claim 18, wherein the processor creates a three-dimensional graph representing the plurality of heights of the droplet at the plurality of positions on the substrate, and models the three-dimensional graphic image corresponding to the shape of the droplet by applying interpolation to two adjacent heights of the plurality of heights in the three-dimensional graph.

20. The inkjet printing facility of claim 18, wherein the processor determines whether the shape of the droplet is within a reference shape range on the basis of the three-dimensional graphic image.

* * * * *